(12) United States Patent
Ohba et al.

(10) Patent No.: US 9,357,203 B2
(45) Date of Patent: May 31, 2016

(54) INFORMATION PROCESSING SYSTEM USING CAPTURED IMAGE, INFORMATION PROCESSING DEVICE, AND INFORMATION PROCESSING METHOD

(71) Applicant: Sony Computer Entertainment Inc., Tokyo (JP)

(72) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 278 days.

(21) Appl. No.: 13/714,765

(22) Filed: Dec. 14, 2012

(65) Prior Publication Data

US 2013/0100255 A1 Apr. 25, 2013

Related U.S. Application Data

(63) Continuation of application No. PCT/JP2010/007121, filed on Dec. 7, 2010.

(30) Foreign Application Priority Data

Jul. 2, 2010 (JP) ................................ 2010-152362

(51) Int. Cl.
*H04N 13/02* (2006.01)
*G06T 3/40* (2006.01)
(Continued)

(52) U.S. Cl.
CPC ............ *H04N 13/0239* (2013.01); *G01S 3/784* (2013.01); *G06K 9/3216* (2013.01); *G06T 3/4038* (2013.01); *H04N 5/232* (2013.01);
(Continued)

(58) Field of Classification Search
None
See application file for complete search history.

(56) References Cited

U.S. PATENT DOCUMENTS 6,335,977 B1 * 1/2002 Kage ............................ 382/107
7,259,747 B2 8/2007 Bell
(Continued)

FOREIGN PATENT DOCUMENTS

| CN | 101673346 A | 3/2010 |
|---|---|---|
| CN | 101720027 A | 6/2010 |

(Continued)

OTHER PUBLICATIONS

Office Action issued for corresponding Japanese Patent Application No. 2012-522362, dated Jul. 16, 2013.
(Continued)

*Primary Examiner* — Kate Luo
(74) *Attorney, Agent, or Firm* — Matthew B. Dernier, Esq.

(57) ABSTRACT

An input information acquisition unit of an information processing device acknowledges a user input. An imaging condition control unit initiates imaging using the imaging condition determined according to the user input or a result of analyzing a captured image. An imaging condition storage unit stores an imaging condition table that maps target functions to imaging conditions. First and second image analysis units and acquire images captured by first and second cameras and installed in the imaging device and perform necessary image analysis. An information integration unit integrates images captured by the pair of cameras and results of analysis. An image data generation unit generates data for an image output as a result of the process.

15 Claims, 11 Drawing Sheets

(51) Int. Cl.
*H04N 5/232* (2006.01)
*H04N 5/235* (2006.01)
*H04N 13/00* (2006.01)
*G01S 3/784* (2006.01)
*G06K 9/32* (2006.01)

(52) U.S. Cl.
CPC ........... *H04N5/2353* (2013.01); *H04N 13/004* (2013.01); *H04N 13/0271* (2013.01); *G06K 2009/3225* (2013.01)

(56) References Cited

U.S. PATENT DOCUMENTS

| | | | |
|---|---|---|---|
| 7,620,202 B2 * | 11/2009 | Fujimura et al. | 382/103 |
| 7,834,846 B1 | 11/2010 | Bell | |
| 2002/0122113 A1 | 9/2002 | Foote | |
| 2002/0186221 A1 | 12/2002 | Bell | |
| 2004/0150724 A1 * | 8/2004 | Nozaki et al. | 348/211.4 |
| 2005/0058337 A1 * | 3/2005 | Fujimura et al. | 382/159 |
| 2005/0128292 A1 | 6/2005 | Miyamaki | |
| 2007/0047768 A1 * | 3/2007 | Gordon et al. | 382/103 |
| 2007/0147827 A1 * | 6/2007 | Sheynman et al. | 396/325 |
| 2007/0189386 A1 * | 8/2007 | Imagawa et al. | 375/240.12 |
| 2007/0298898 A1 * | 12/2007 | Kiraly | 473/131 |
| 2008/0055412 A1 * | 3/2008 | Tanaka | 348/159 |
| 2009/0304230 A1 * | 12/2009 | Krahnstoever et al. | 382/103 |
| 2010/0013917 A1 * | 1/2010 | Hanna et al. | 348/143 |
| 2011/0145581 A1 | 6/2011 | Malhotra | |

FOREIGN PATENT DOCUMENTS

| | | | |
|---|---|---|---|
| JP | 2000172654 A | 6/2000 | |
| JP | 2002262159 A | 9/2002 | |
| JP | 2003178274 A | 6/2003 | |
| JP | 2003234941 A | 8/2003 | |
| JP | 2004235781 A | 8/2004 | |
| JP | 2005012655 A | 1/2005 | |
| JP | 2005500719 A | 1/2005 | |
| JP | 2007200209 A | 8/2007 | |
| JP | 2008278430 A | 11/2008 | |
| JP | 2010109554 A | 5/2010 | |
| JP | 2012019413 A | 1/2012 | |
| JP | 2012226762 A | 11/2012 | |
| JP | 2013143154 A | 7/2013 | |
| WO | 2005015266 A2 | 2/2005 | |
| WO | 2007050885 A2 | 5/2007 | |

OTHER PUBLICATIONS

International Search Report for corresponding PCT Application No. PCT/JP2010/007121, dated Mar. 8, 2011.
International Preliminary Examination Report on Patentability and Written Opinion for corresponding PCT Application No. PC/JP2010/007121, dated Feb. 12, 2013.
Office Action issued for corresponding Chinese Patent Application No. 2010800677144, dated Feb. 4, 2015.
European Search Report for corresponding EP Patent Application No. 10854052.7, dated Apr. 29, 2015.
Mami Noguchi et al: 11 Geometric and Timing Calibration for Unsynchronized Cameras Using Trajectories of a Moving Marker 11 Applications of Computer Vision, 2007. WACV '07. IEEE Workshop on. IEEE. PI., 6 pp. 1-6, Feb. 2007.
European Search Report for corresponding EP Patent Application No. 10854052.7, dated Oct. 6, 2015.
Office Action for corresponding JP Patent Application No. 2013-196950, dated Jul. 21, 2015.

* cited by examiner

INFORMATION PROCESSING SYSTEM USING CAPTURED IMAGE, INFORMATION PROCESSING DEVICE, AND INFORMATION PROCESSING METHOD

BACKGROUND OF THE INVENTION

1. Field of the Invention

The present invention relates to an information processing system for successively displaying output images based on captured images, to an information processing device included in the system, and an information processing method used in the system.

Recently, it is common to mount a camera in a personal computer or a game device to capture an image of a user and to use the system in a variety of manners. For example, an image of a user in a teleconference or a video chat may be directly transmitted to a remote user over a network. Other applications already in practical use include recognizing the motion of a user by image analysis and using the motion as inputs in a game or information processing (e.g., patent document 1).

In order to perform various processes responsively and accurately using a captured image, an imaging condition suited to the details of processing are called for. However, due to the manufacturing cost, the available bandwidth of transmitting images, responsiveness of the process from capturing of an image to provision of an output, and so on, it is difficult to reinforce the functionality of an information processing device merely by increasing the performance of a camera or improving image quality.

2. Related Art List

WIPO Patent Document WO 2007/050885 A2

SUMMARY OF THE INVENTION

The present invention addresses the issue and a purpose thereof is to provide a technology capable of reinforcing the functionality of an information processing device that uses a captured image in an inexpensive and efficient manner.

One embodiment of the present invention relates to an information processing system. The information processing system is adapted to generate output image data by capturing an image of a subject and successively acquiring data of the image, and comprises: a pair of cameras comprising first and second cameras having the same structure and configured to capture first and second images of the subject using different imaging conditions defined, respectively, for the pair of cameras in order to each obtain individual information on the same subject; and an information integration unit configured to integrate the individual information included in the image data from two channels captured by the pair of cameras, respectively, so as to generate output image data through one channel.

The term "subject" does not necessarily refer to a human being explicitly defined as a target of imaging but encompasses a room, human being, object, animal, etc., that enters the field of view of a camera. Therefore, the term "individual information on the subject" may not necessarily mean individual information on an entity but encompasses information on any of a plurality of entities included in the subject or individual information on each of the plurality of entities.

Another embodiment of the present invention relates to an information processing device. The information processing device is adapted to generate output image data by successively acquiring image data of an image capturing a subject, and comprises: an imaging condition control unit configured to control a pair of cameras connected to the information processing device and both having the same structure so as to capture images using different imaging conditions defined respectively for the pair of cameras in order to obtain individual information on the same subject; and an information integration unit configured to acquire image data from two channels captured by the pair of cameras, respectively, and synthesize the individual information included in the image data so as to generate output image data through one channel.

Another embodiment of the present invention relates to an information processing method. The information processing method is adapted to successively acquire image data of an image capturing a subject and to output associated output image data, and comprises: using a pair of cameras having the same structure to capture images using different imaging conditions defined, respectively, for the pair of cameras in order to each obtain individual information on the subject; acquiring image data from two channels captured by the pair of cameras, respectively, and synthesizing the individual information included in the image data so as to generate output image data through one channel; and outputting the output image data to a display device.

Optional combinations of the aforementioned constituting elements, and implementations of the invention in the form of methods, apparatuses, systems, and computer programs may also be practiced as additional modes of the present invention.

According to the present invention, various functions utilizing captured images can be implemented at low cost.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Embodiment 1

Figure 1:
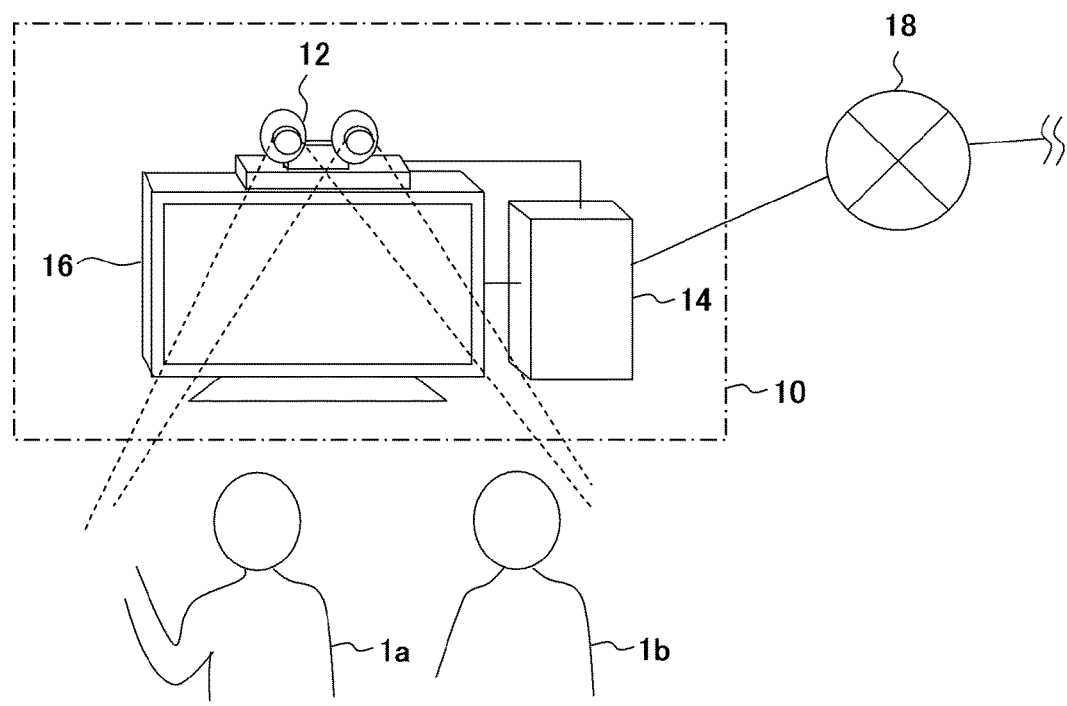
FIG. 1 shows an exemplary configuration of an information processing system to which the embodiment of the present invention can be applied.

FIG. 1 shows an exemplary configuration of an information processing system to which the embodiment of the present invention can be applied. An information processing system 10 includes an imaging device 12 provided with two cameras for capturing an image of a subject such as users 1a and 1b, an information processing device 14 for performing information processing responsive to the user's request, based on the captured image, and a display device 16 for outputting image data obtained as a result of processing in the information processing device 14. The information processing device 14 is configured to be connected to a network 18 such as the Internet.

The information processing device 14 and the imaging device 12, the display device 16, or the network 18 may be connected by cable or connected wirelessly by a wireless local area network (LAN) or the like. Two or all of the imaging device 12, the information processing device 14, and the display device 16 may be combined and integrated. Further, the imaging device 12 may not necessarily be provided on the display device 16. Still further, the users 1a and 1b may not be human beings and the number thereof is non-limiting.

The imaging device 12 comprises a pair of camera with the same structure capturing images of a subject located in the same space. The imaging device 12 may be implemented by a stereo camera, which is already in practical use to capture depth information of a subject. In other words, the imaging device 12 may be any pair of cameras with respective lenses capable of covering substantially the same field of view by disposing them side by side. Meanwhile, the interval between the two cameras or the relative position thereof is non-limiting so long as the interval is known and the correspondence between at least parts of the fields of view can be derived by correcting for the parallax. In an alternative configuration, a single lens may be provided so that two cameras are substantially implemented by dispersing an image captured by the lens inside the imaging device 12.

At least one of the two cameras is provided with the capabilities for electronic zooming, electronic pan and tilt, or an equivalent function of cropping an image, so that the fields of view of the cameras are controlled by the information processing device 14 so as to be independently varied. The imaging condition (e.g., white balance, frame rate, exposure time, and stop value) is configured to be independently controlled in the two cameras using the information processing device 14.

The imaging device 12 captures data for moving or still images including the users 1a, 1b, etc. under the imaging condition designated by the information processing device 14. The image data thus captured is fed to the information processing device 14. The information processing device 14 determines subsequent imaging condition based on the image data acquired from the imaging device 12 and feeds the imaging condition back to the imaging device 12. The information processing device 14 further performs information processing corresponding to the function designated by the user, based on the image data acquired from the imaging device 12, so as to generate output image data.

The generated image data is output to the display device 16 or transmitted to another information processing device connected via the network 18. The display device 16 may be a television set provided with a display for outputting an image and a speaker for outputting sound.

Figure 2:
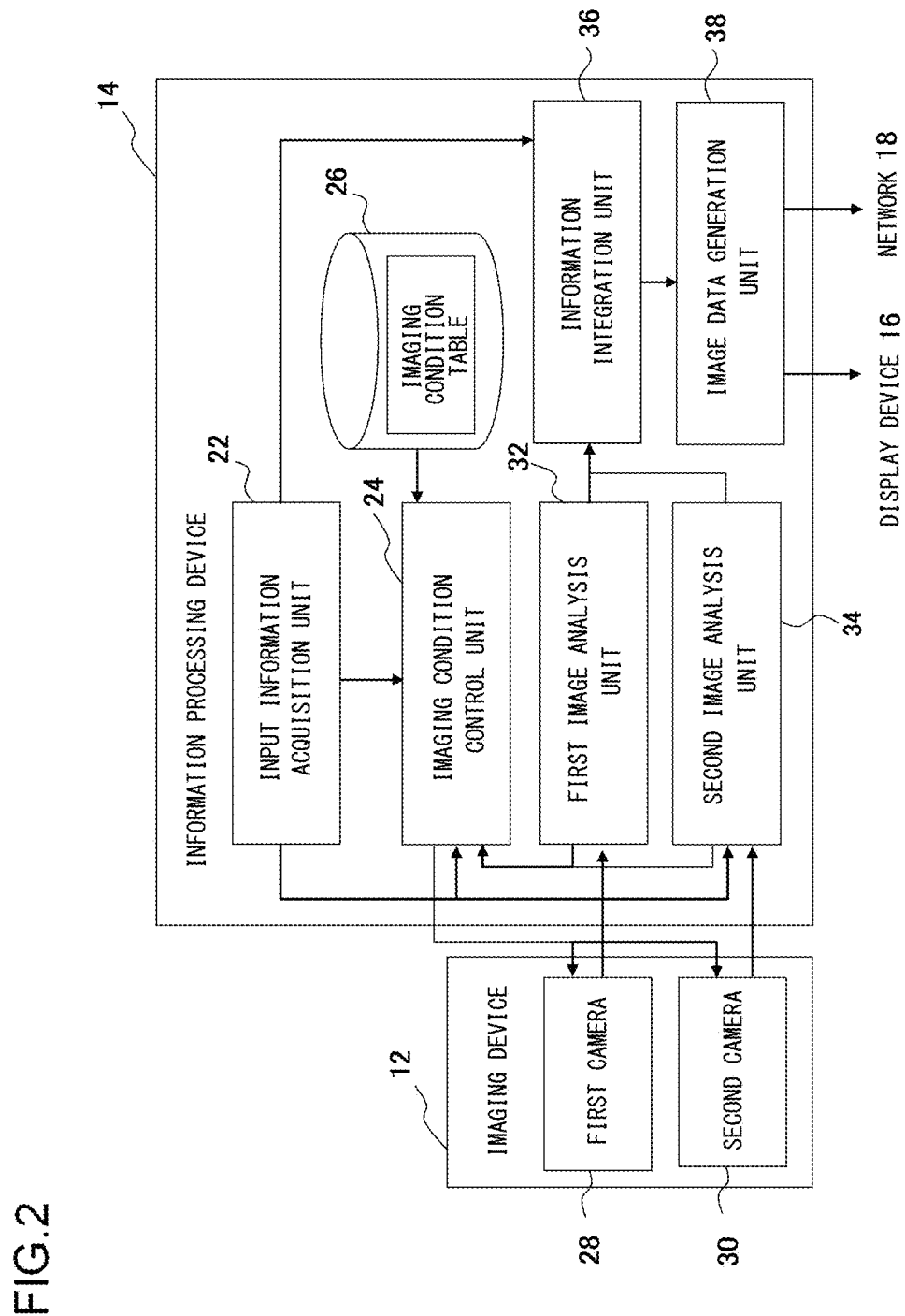
FIG. 2 shows the configuration of the imaging device and the information processing device according to the embodiment in detail.

FIG. 2 shows the configuration of the imaging device 1 and the information processing device 14 in detail. The information processing device 14 includes an input information acquisition unit 22 for acknowledging a user input, an imaging condition control unit 24 for initiating imaging under the imaging condition determined according to the user input or the result of analyzing the captured image, an imaging condition storage unit 26 for storing an imaging condition table that maps target functions to imaging conditions, first and second image analysis units 32 and 34 for respectively acquiring and analyzing images captured by the first and second cameras 28 and 30 mounted in the imaging device 12, an information integration unit 36 for integrating images captured by the pair of cameras and results of the analysis, and an image data generation unit 38 for generating data for an image output as a result of the process.

The elements depicted in FIG. 2 as functional blocks for performing various processes are implemented by hardware such as a CPU, a memory, or other LSI's, and by software such as a program for image processing. Therefore, it will be obvious to those skilled in the art that the functional blocks may be implemented in a variety of manners by hardware only, software only, or a combination of thereof.

The input information acquisition unit 22 is an interface for acknowledging a user input in the information processing device 14 and is implemented by an ordinary input device such as a pointing device, a mouse, a keyboard, a touch panel, a game controller, or a button. The input information acquisition unit 22 may be a device having a casing separate from that of the information processing device 14 and connected to the device 14 wirelessly or by cable. User inputs include an input for selecting a function executable by the information processing device 14, and an input for moving or selecting a cursor or a frame displayed on the display device 16. The information acquired by the input information acquisition unit 22 is communicated to the imaging condition control unit 24, the first image analysis unit 32, the second image analysis unit 34, and the information integration unit 36 as appropriate. Examples of functions executable by the information processing device 14 will be described later.

The imaging condition control unit 24 determines the imaging condition in the first and second cameras 28 and 30 in accordance with the user input in the input information acquisition unit 22, and initiates imaging under the determined condition by sending an imaging request signal to at least one of the two cameras. The initial value of the imaging condition is obtained by referring to the imaging condition table stored in the imaging condition storage unit 26, according to the function designated by the user as a key. The imaging condition control unit 24 continues to determine the imaging condition based on the result of analyzing the image captured by at least one of the first and second cameras 28 and 30, and causes at least one of the cameras to start imaging under the determined condition.

The first image analysis unit 32 acquires the image captured by the first camera 28, and the second image analysis unit 34 acquires the image captured by the second camera 30. Both units 32 and 34 analyze the images according to the function selected by the user. Image analysis may not be required depending on the function selected by the user. In this case, the image data may be directly sent to, for example, the information integration unit 36. Therefore, the first and second image analysis units 32 and 34 acquire information on the function selected by the user from the input information acquisition unit 22 before performing the process. The result of analysis by the first image analysis unit 32 and the second image analysis unit 34 is transmitted to the imaging condition control unit 24 and used for further determination of the imaging condition or transmitted to the information integration unit 36.

The information integration unit 36 integrates the results of analysis by the first and second image analysis units 32 and 34 or integrates the image data transmitted from the units 32 and 34. The type of integration differs depending on the function selected by the user. Therefore, the information integration unit 36 acquires information on the function selected by the user from the input information acquisition unit 22 before performing the process. The image data generation unit 38 generates image data for outputting the result integrated by the information integration unit 36 as an image, and outputs the data to the display device 16 or the network 18.

Figure 3:
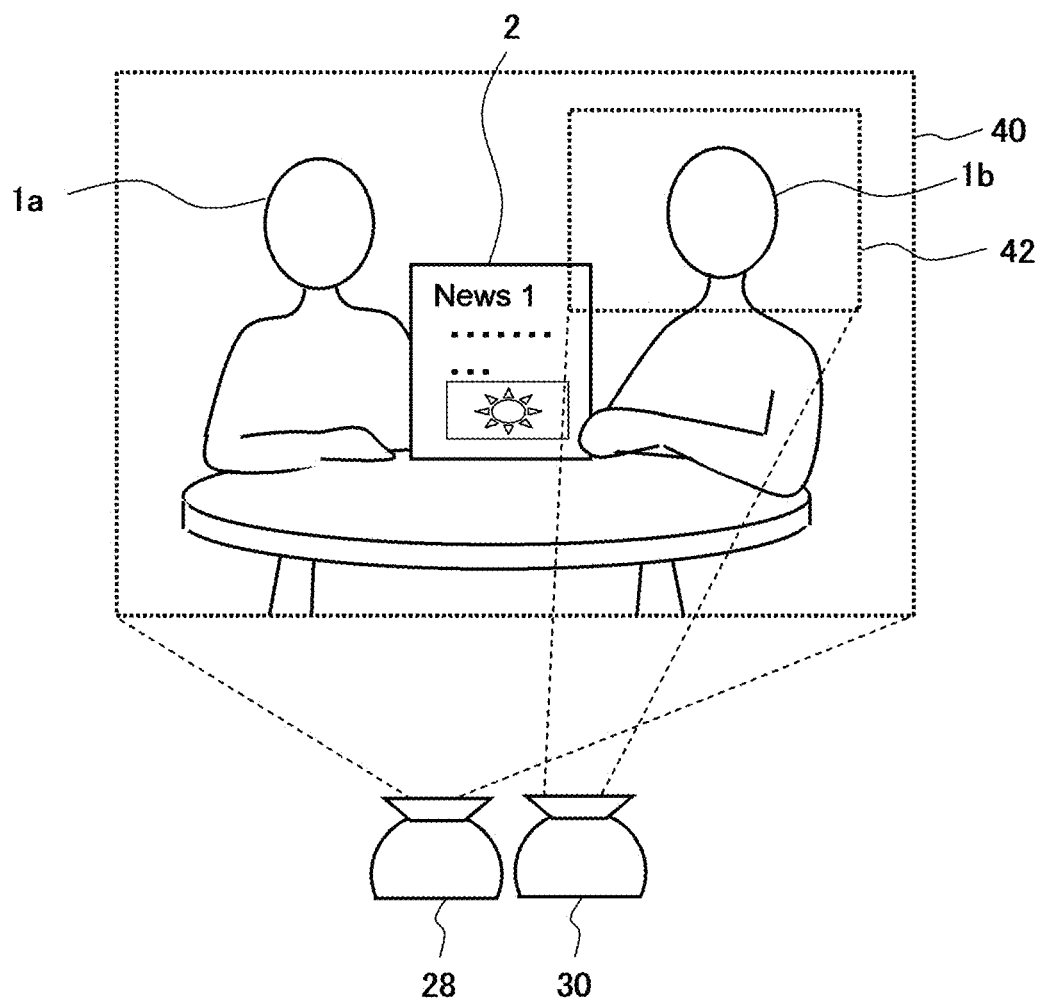
FIG. 3 shows an example of a situation of imaging assumed in the present embodiment.

A description will be given of a specific example of the function implemented by the information processing system 10. FIG. 3 shows an example of a situation of imaging assumed in the present embodiment. In the illustrated example, the first and second cameras 28 and 30 are capturing an image of two users 1a and 1b being at the table talking. The target of imaging is not limited to human beings such as the users 1a and 1b. An object such as a flip 2 held by a user may be captured in an image. Captured image are successively transmitted to, for example, another information processing system via the network 18 and are displayed in a display device of the other information processing system.

This allows the conversation between the users 1a and 1b to be seen at a remote location. By performing similar processes alternately in the two information processing systems 10, video chat or teleconference capabilities can be implemented. A commonly available technology may be employed for procedures for establishing a network or transmitting data to achieve these capabilities, so that a description thereof is omitted. Image data may not be transmitted over a network. Images resulting from the process may be displayed on the display device 16 watched by the users 1a and 1b, targets of imaging, so that the users 1a and 1b can enjoy a game.

In a situation as illustrated, the two cameras of the information processing system 10 according to the embodiment capture the same subject in different conditions, thereby allowing output information to be produced by appending additional information to the captured image. In the example of FIG. 3, the first camera 28 captures a wide-angle view of an entirety region 40 of the subject, and the second camera 30 captures a narrow-angle view of only a region 42 of the face of the user 1b. The image captured by the second camera 30 is defined to be of the same pixel size as the image captured by the first camera 28.

As a result, the image captured by the second camera 30 is of a higher resolution than the image captured by the first camera 28. This allows images with different qualities to be acquired. Namely, the image captured by the first camera 28 is of a normal resolution and is a wide-angle view, and the image captured by the second camera 30 is of a high resolution and is a narrow-angle view. According to the embodiment, the same subject or the same space is concurrently captured in different conditions so as to enable a variety of processes by integrating the information in the images.

A detailed description will now be given of examples of functions implemented by the information processing system 10. These functions are by way of example. The information processing system 10 may implement one or a combination of two or more of these functions. The information processing system 10 need not implement all of the functions.

(1) Embodiment in which the Angle of View and Resolution Differ.

According to this embodiment, the two cameras differ in the angle of view, as described with reference to FIG. 3. By allowing the two cameras to capture the image with the same pixel size, it is ensured that the smaller the angle of view, the higher the resolution. By synthesizing these images for output, an image showing only an area of interest (e.g., the face of a human being) in detail can be displayed.

Figure 4:
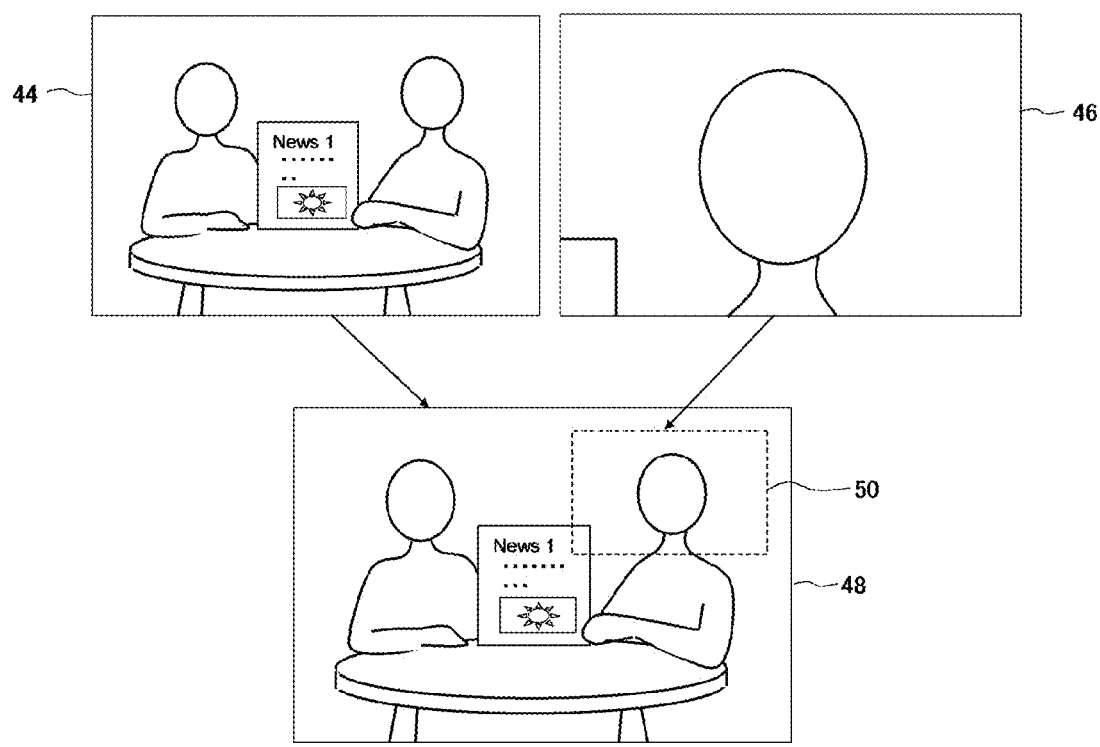
FIG. 4 shows examples of images captured by the imaging devices and an example of output image obtained by using these images according to an variation of the embodiment in which the imaging devices differ in the magnitude of angle of view and resolution.

FIG. 4 shows examples of images captured by the first and second cameras 28 and 30 and an example of output image obtained by using these images. In the illustration, the image captured by the first camera 28 is a wide-angle image 44 representing the region 40 in FIG. 3. The image captured by the second camera 30 is a narrow-angle image 46 representing the region 42 in FIG. 3.

If the area of the narrow-angle image 46 is ⅓ the area of the wide-angle image 44 vertically and horizontally, the resolution of the narrow-angle image 46 is 3 times that of the wide-angle image 44 vertically and horizontally. The images need not have the identical pixel size or aspect ratio. An allowable range may first be defined for the size of image data in consideration of the processing capabilities so that the relationship between the angle of view and the resolution may be appropriately determined accordingly.

In order to determine the angle of view of the narrow-angle image 46, the wide-angle image 44 is first captured and then a region that can be a target of imaging with a narrow angle is detected by running a facial recognition process. The image representing the candidate target region on the wide-angle image 44 is displayed on the display device 16 to accept selection by the user. The position of the selected target region in the wide-angle image 44 is stored. The narrow-angle image 46 is synthesized in the corresponding region in the wide-angle image 44 and the resultant image is output. This displays a synthesized image 48 in which only a user-selected target region 50 in the wide-angle image 44 has a higher resolution.

Figure 5:
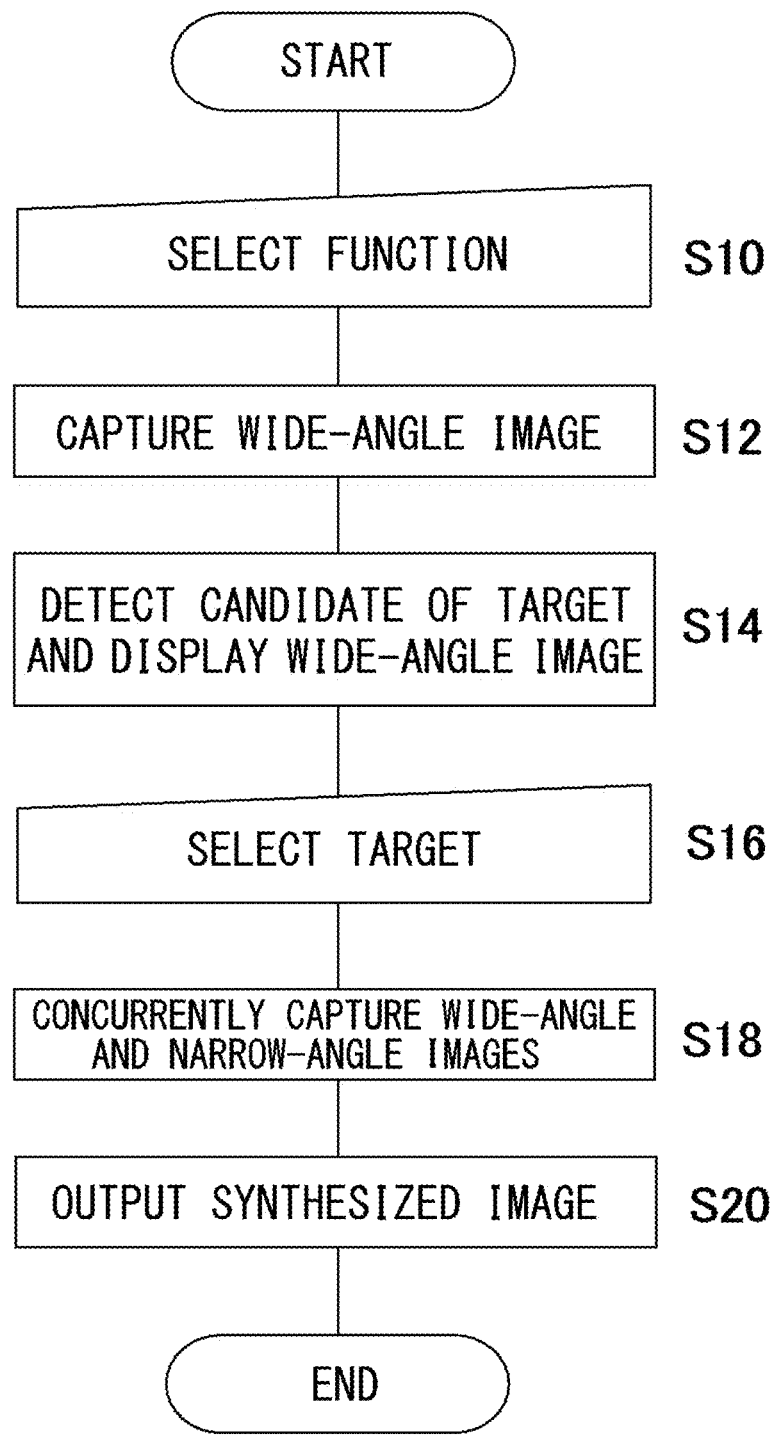
FIG. 5 is a flowchart showing the steps of information processing according to a variation of the embodiment in which the imaging devices differ in the magnitude of angle of view and resolution.

FIG. 5 is a flowchart showing the steps of information processing according to this embodiment. Referring to the flowchart shown in FIG. 5 and FIGS. 9 and 13 mentioned later, the steps in the respective components are denoted by a combination of S (initial letter of Step), which indicates "step", and a numeral. The flowchart of FIG. 5 is started when the user provides an input to start imaging and outputting of image data in the input information acquisition unit 22.

First, the user provides, in the information acquisition unit 22, a user input to select a function (S10). For example, the user selects, in the menu screen displayed on the display device 16, a function such as a video chat that utilizes the aforementioned function. The information is communicated to the imaging condition control unit 24, the first image analysis unit 32, the second image analysis unit 34, and the information integration unit 36. As the first image analysis unit 32, the second image analysis unit 34, and the information integration unit 36 are notified, the sequence of the process according to the selected function is defined. In practice, the process may be selection of a script file or a program. The above applies to other examples described later.

The imaging condition control unit 24 causes the first camera 28 to start imaging at a standard angle of view and resolution (S12). The imaging condition can be determined by referring to the imaging condition table stored in the imaging condition storage unit 26 and acquiring the imaging condition defined for the selected function. The image captured in this case is exemplified by the wide-angle image 44 shown in FIG. 4. Before starting imaging, white balance or stop value in the first camera 28 may be automatically adjusted using a known technology so as to be best suited to the actual imaging environment.

The data for the image captured by the first camera 28 is sent to the first image analysis unit 32. The first image analysis unit 32 analyzes the data for the image and detects a candidate region such as the face region of a human being that could be a target of narrow-angle image. The image data generation unit 38 generates image data in which the detected region is bounded by a rectangle and outputs the generated data to the display device 16 (S14).

A known detection technology such as facial detection by detection of a feature point, or detection of a predetermined subject by pattern matching is used for image analysis performed by the first image analysis unit 32. The target subject (e.g., face, hand, a particular marker, etc.) may be selected by the user from a list of objects that can be detected. The method of detection may be appropriately determined according to the selected subject. When the face was detected, the image displayed in S14 is an image produced by displaying the image of the region 40 of FIG. 3 and then overlaying frames indicating boundaries of the facial regions of the users 1a and 1b like the region 42.

A cursor pointing to one of the frames is further displayed so that the user can move the cursor and indicate selection via the input information acquisition unit 22. The color of the frame may represent the target of selection. The user selects a target by watching the display device 16 (S16). In response, the imaging condition control unit 24 causes the second camera 30 to image the region indicated by the frame bounding the selected target. Consequently, the wide-angle image and the narrow-angle image are started to be captured by the first and second cameras 28 and 30 concurrently (S18). The imaging condition control unit 24 causes the selected region to be captured by controlling the electronic zoom and electronic pan and tilt capabilities of the second camera 30. As mentioned above, the relative position information indicating the position of the narrow-angle image in the wide-angle image is communicated from the input information acquisition unit 22 to the information integration unit 36.

The data for the wide-angle image and the narrow-angle image captured by the two cameras is successively supplied to the information integration unit 36 via the first and second image analysis units 32 and 34. The information integration unit 36 transmits the two sets of image data to the image data generation unit 38 along with the relative position information and directs the unit 38 to synthesize the data, whereupon the image data generation unit 38 generates and outputs a synthesized image (S20). This displays an image capturing the facial expression of the user 1b in detail on the display device of the remote user in, for example, a video chat.

Since only a part of the whole image is at a higher resolution, requirement to see a region of interest in detail without consuming the bandwidth heavily due to an increase in the size of image data can be met. Since the cameras need only have ordinary capabilities, the manufacturing cost is not increased.

Figure 6:
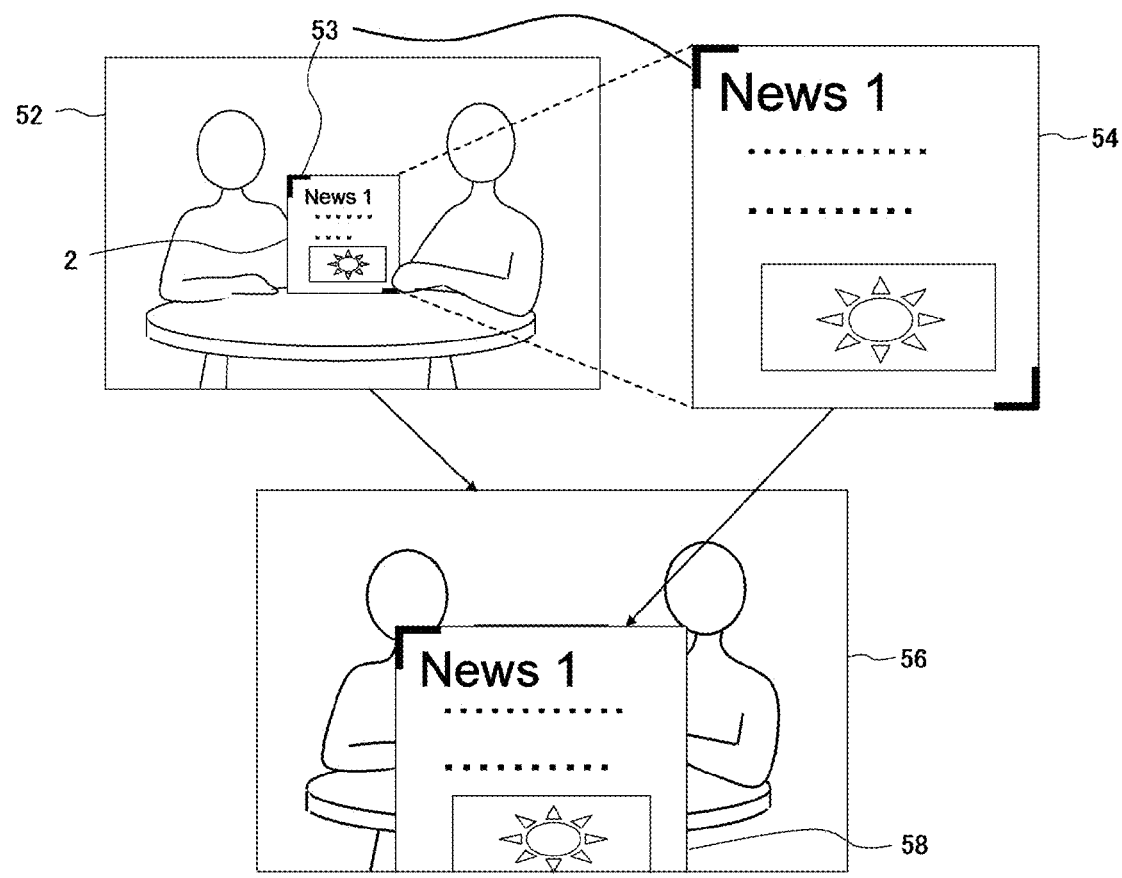
FIG. 6 shows a variation of the embodiment in which the imaging devices differ in the magnitude of angle of view and resolution.
Figure 7:
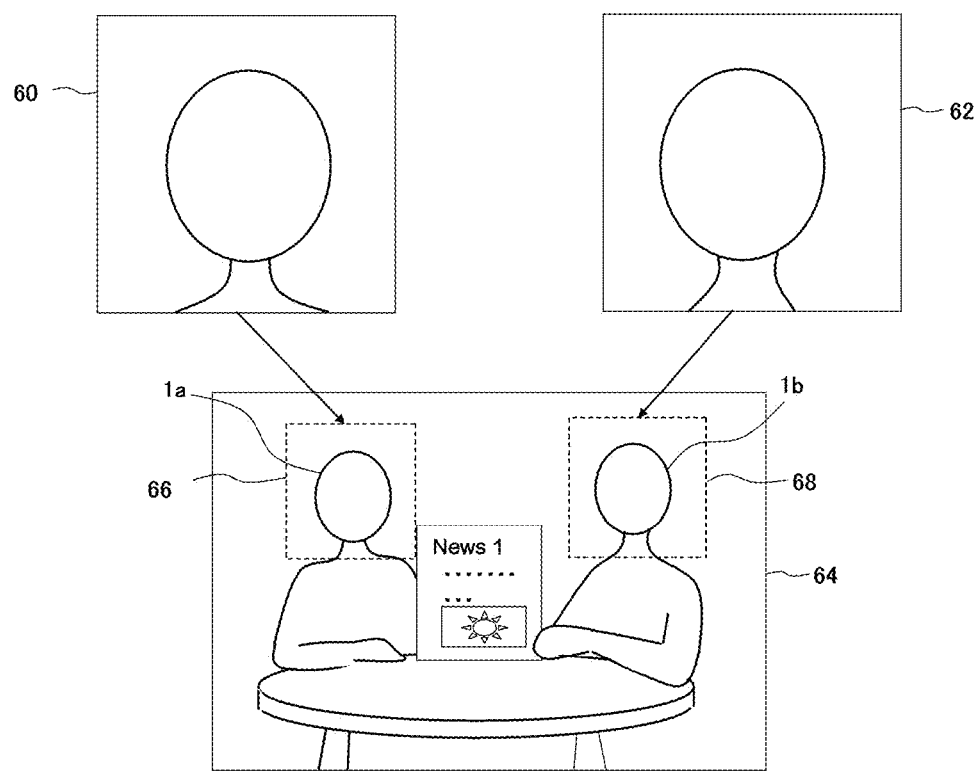
FIG. 7 shows a variation of the embodiment in which the imaging devices differ in the magnitude of angle of view and resolution.

FIGS. 6 and 7 show a variation to the embodiment. FIG. 6 shows examples of captured images and an output image when a flip 2 held by the user is target. The flip 2 is marked by markers 53 having a predetermined color and shape at, for example, two of the four corners diagonally across from each other. This allows the first image analysis unit 32 to detect the marker by, for example, pattern matching, in S14 of FIG. 5 and detect the region of the flip as a candidate of target accordingly.

If the user selects the flip as a target in S16, the image captured by the first camera 28 will be a wide-angle image 52 and the image captured by the second camera 30 will be a narrow-angle image 54 of the region of the flip. As in the case described above, the narrow-angle image 54 will be a high-resolution image so that characters on the flip are shown more clearly than in the wide-angle image 52.

The images are synthesized to produce a synthesized image 56. In this example, it is ensured that characters are viewed even more clearly by displaying an image 58 produced by enlarging the narrow-angle image 54 representing the relevant region, as compared to the area of the flip inside the wide-angle image 52. Thus, subjects within the same field of view may be processed according to the nature of each subject before displaying a synthesized image.

FIG. 7 shows examples of captured images and an output image when both the first and second cameras 28 and 30 capture narrow-angle images. In this case, user selection of two targets is acknowledged in S16 of FIG. 4. In S18, the first camera 28 captures a narrow-angle image 60 of one of the targets and the second camera 30 captures a narrow-angle image 62 of the other target. In the illustrated example, the face of the user 1a and the face of the user 1b are selected as targets.

Since no cameras capture a wide-angle image, one of the frames of images captured by the first camera 28 when the target is selected in S16 of FIG. 4 is displayed as a still image to serve as the wide-angle image in the synthesized image 64. As a result, only target regions 66 and 68 in the synthesized image 64 are at a higher resolution and are in motion, and a still image is displayed in the other regions. In this manner, the number of targets can be as many as the number of cameras, under the situation where the regions desired to be viewed in detail are limited and the motion in the other regions is not so important.

The synthesized image may comprise only the two narrow-angle images 60 and 62 enlarged to fit the size of the screen of the display device 16 and displayed side by side. Alternatively, the image such as this and the synthesized image 64 of FIG. 7 may be switchable. When the target moves heavily, the target may be ensured to be included in the narrow-angle image by causing the first camera 28 to capture a wide-angle image, causing the first image analysis unit 32 to track the target by a known technology, and causing the imaging condition control unit 24 to accordingly adjust the field of views of the cameras by using the electronic pan and tilt capabilities. The above applies to all of the aforementioned cases.

(2) Embodiment in which the Magnitude of Angle of View and Frame Rate Differ.

According to this embodiment, it is ensured that the frame rates of the two cameras capturing respective images differ. More specifically, one of the cameras captures a whole image at a standard frame rate, and the other camera captures a narrow-angle image of a target at a high frame rate. The image captured at a high frame rate is used to track a target or a portion included in the target. This allows efficient and accurate tracking of a region of interest without increasing the data size.

Figure 8:
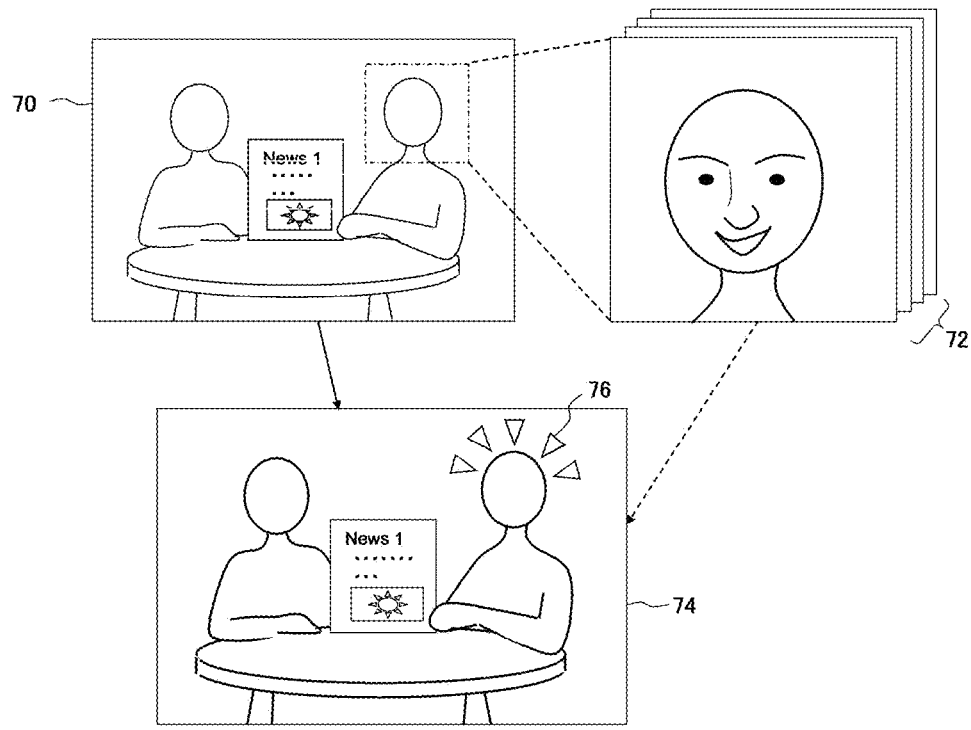
FIG. 8 shows examples of images captured by the imaging devices and an example of output image obtained by using the images according to a variation of the embodiment in which the imaging devices differ in the magnitude of angle of view and frame rate.

FIG. 8 shows examples of images captured by the first and second cameras 28 and 30 and an example of output image obtained by using the images. Referring to the figure, the image captured by the first camera 28 is a wide-angle image 70 representing the region 40 in FIG. 3. The image captured by the second camera 30 is a narrow-angle, high frame rate image 72 of a target region. Given that n1<n2, the second camera 30 captures a total of n2 frames of narrow-angle, high frame rate images 72 while the first camera 28 captures a total of n1 frames of wide-angle images 70.

The second image analysis unit 34 tracks a subject by a known method in the narrow-angle, high frame rate image 72. If the face is a target, variation in the facial expression is recognized by tracking a portion of the face such as the eye or the mouth. If the head or the hand is a target, a gesture is recognized by tracking the contour. In this case, the output image 74 is produced by processing the wide-angle image 70 according to the result of tracking. In the example of FIG. 8, that the target face shows a smile is recognized and an associated animation 76 is added.

Recently, technologies capable of recognizing a facial expression or a gesture by imaging and tracking the motion of a subject, and using the motion as input information to cause a game to progress or perform information processing have been put into practical use. In order to track a subject accurately, it is desirable to capture an image at a high frame rate so that the time resolution relative to the motion is increased. However, as the size of acquired image data is increased by imaging at a high frame rate, the bus bandwidth and memory areas in the information processing device 14 may be heavily consumed.

According to this embodiment, the device narrows down the target using a wide-angle image and captures only an image of a target region at a high frame rate to track the subject. Therefore, the size of image data is prevented from growing. Even if the target is heavily displaced, information on the overall motion can be acquired in a wide-angle image so that it is possible to narrow down the position of the target efficiently. By using an image captured at a standard frame rate as an ultimately output image, images suitable for display and containing little noise can be produced.

Figure 9:
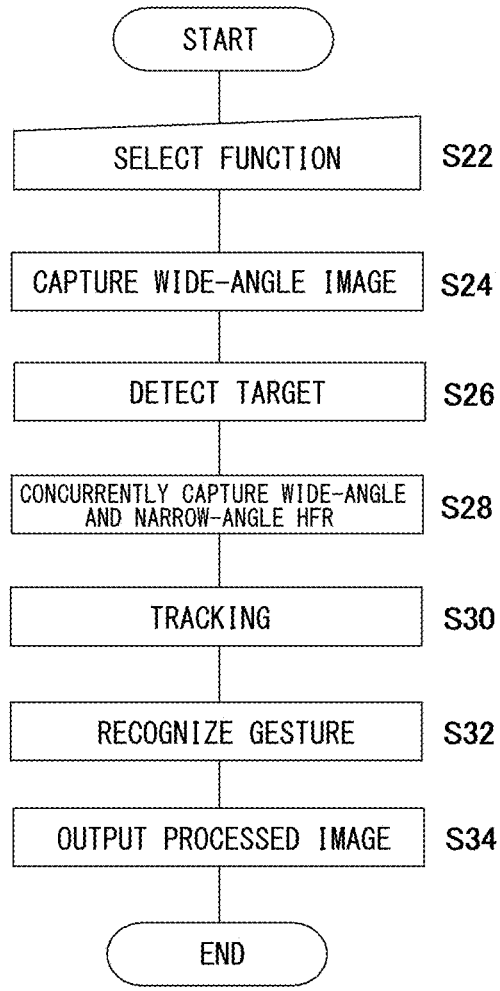
FIG. 9 is a flowchart showing the steps of information processing according to the embodiment in which the imaging devices differ in the magnitude of angle of view and frame rate.

FIG. 9 is a flowchart showing the steps of information processing according to this embodiment. The flowchart of FIG. 9 is started when the user provides an input to start imaging and outputting of image data in the input information acquisition unit 22. As in FIG. 5, the user provides, in the information acquisition unit 22, a user input to select a function (S22). The imaging condition control unit 24 causes the first camera 28 to start imaging at a standard angle of view and frame rate in accordance with the imaging condition defined for the selected function (S24).

The first image analysis unit 32 acquires and analyzes the data for the image captured by the first camera 28 so as to detect a predetermined subject (e.g., the face, hand, or head of a human being) as a target (S26). As described with reference to FIG. 5, the detected candidate of target may be displayed so as to be bounded by a frame, allowing the user to select the target. As also described with reference to FIG. 5, a known method such as pattern matching may be used as a method of detecting a target. For example, the face may be detected by facial recognition and then the position of the contour of the hand or head may be estimated by referring to the relative position before performing pattern matching and ultimately identifying the target.

Information on the detected target is communicated to the imaging condition control unit 24. The imaging condition control unit 24 causes the second camera 30 to image the region of the selected target at a high frame rate. Thereby, the wide-angle image and the narrow-angle image are started to be captured by the first and second cameras 28 and 30 concurrently (S28). Information on the position of the tracked target is communicated to the information integration unit 36.

The second image analysis unit 34 then tracks the target in the narrow-angle, high frame rate image captured by the second camera 30 (S30). The actual shape of the target acquired when the target is detected in S26 may be stored as a template image for the purpose of tracking so that the position of the target is tracked by computing a matching score with a high frame rate image. A detection that a predetermined gesture is made by referring to a change in the position of the target obtained as a result of tracking (S32). For example, a table mapping patterns of variation in the change of a target to gestures may be stored in, for example, a memory so as to make a determination on a gesture by referring to the table.

Methods in practical use in games or the like may be employed as the method of recognizing a gesture. The term "gesture" means any change in form that could be assigned a meaning such as change in facial expression well as an action of gesture commonly made a human being.

The result of recognizing a gesture and the data for a wide-angle image captured by the first camera 28 are successively supplied to the information integration unit 36. The information integration unit 36 transmits the image data to the image data generation unit 38 along with an animation or content of image processing prepared in association with the gesture, and information indicating the position where the process is applied, and directs the unit 38 to process the image. In response, the image data generation unit 38 generates and outputs a processed image (S34).

In this embodiment, the process performed in response to recognition of a gesture is non-limiting. Amore complicated representation may be given. For example, aside from simple addition of an animation as shown in FIG. 8, the figure of a user in the wide-angle image may be blended in an image representing a virtual world so that a certain change is induced in the virtual world in response to a gesture of the user. The image output in response to tracking or recognition of a gesture may be generated by using a variety of known image processing techniques in combination to suit the content of game or purpose of information processing.

Depending on the content of processing, the wide-angle image and the narrow-angle, high frame rate image need not always be concurrently captured. One of the two cameras may be turned on or off depending on a period of time required for acquisition of image. For example, when a baseball game is represented in an image, a wide-angle image is captured without interruption so as to display an image showing the figure of a user and the scenery of a baseball stadium synthesized. And the motion of the arm of the user may be imaged at a narrow angle and a high frame rate only in the period of swing by the user as a batter, and the batted ball may be displayed in animation to reflect the angle and speed of the swing.

Conversely, when a wide-angle image is not used as an output image and only the result of recognizing a gesture is used for output information, a wide-angle image may be captured only when a target is lost in the narrow-angle, high frame rate image to enable a search for the target in a wide range. Thus, by defining the period of imaging the wide-angle image and the period of imaging the narrow-angle, high frame rate image depending on the needs, the amount of consumed resources can be adjusted depending on the content of processing.

Meanwhile, by running information acquisition in a limited space and at a relatively higher temporal resolution and global image acquisition in a wide space in parallel, the information can be compensated by each other so that extensive applications are possible. For example, the result of tracking may be fed back to the wide-angle image so as to trace the motion in the global perspective or highly accurate tracking in a limited range is performed by referring to the motion in the global perspective.

As described with reference to FIG. 7, once targets are detected in a wide-angle image initially captured by the first camera 28, narrow-angle, high frame rate images of the two targets may be captured by the two cameras. This allows the gesture of the two targets to be recognized independently, and allows, for example, a match-up game in a virtual space to be represented.

As in the embodiment (1), the narrow-angle, high frame rate image may be captured at the same pixel size as the wide-angle image and at a higher resolution. Alternatively, the narrow-angle, high frame rate image may be captured at the same resolution as the wide-angle image. The resolution may be determined initially according to the required accuracy of tracking, processing capabilities of the information processing device, bus bandwidth available for data transfer, etc.

Figure 10:
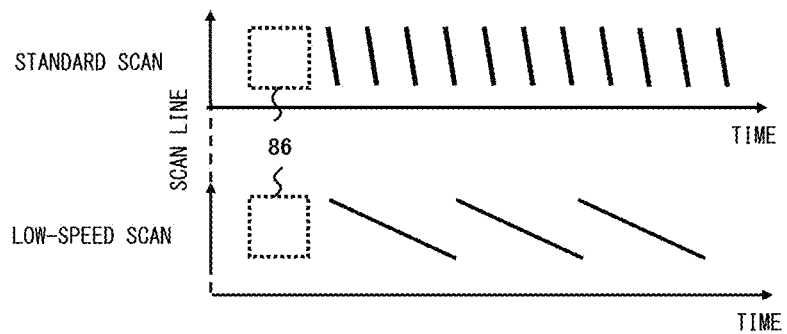
FIG. 10 shows a figure to explain scan time of an image according to the embodiment in which the imaging devices differ in the magnitude of angle of view and frame rate.

In the aforementioned examples, the second camera captures the narrow-angle image at a higher frame rate. Conversely, the narrow-angle image may be captured at a low frame rate. As the frame rate is lowered and the scan rate at which to capture the image is decreased, the amount of information on motion included in a single frame is increased. FIG. 10 shows a figure for explaining the scan time of an image according to this embodiment. The figure schematically shows a temporal displacement (solid line) of a scan line in a camera sensor region indicated by a rectangle 86, the horizontal axis representing a time axis.

In the case of low-speed scan shown at the bottom, the time required for a scan from top to bottom in the sensor region is longer than in the case of a standard scan speed shown at the top. Therefore, the number of frames captured in the same period of time is fewer, but the frequency of occurrence of blind periods between the completion of acquisition of a single frame image and the acquisition of a subsequent frame image is lowered. Therefore, information with high temporal resolution on a moving object can be acquired. Further, since a single frame contains information covering a longer period of time, gestures can be recognized such that the processing load is lower and latency is lower.

Figure 11:
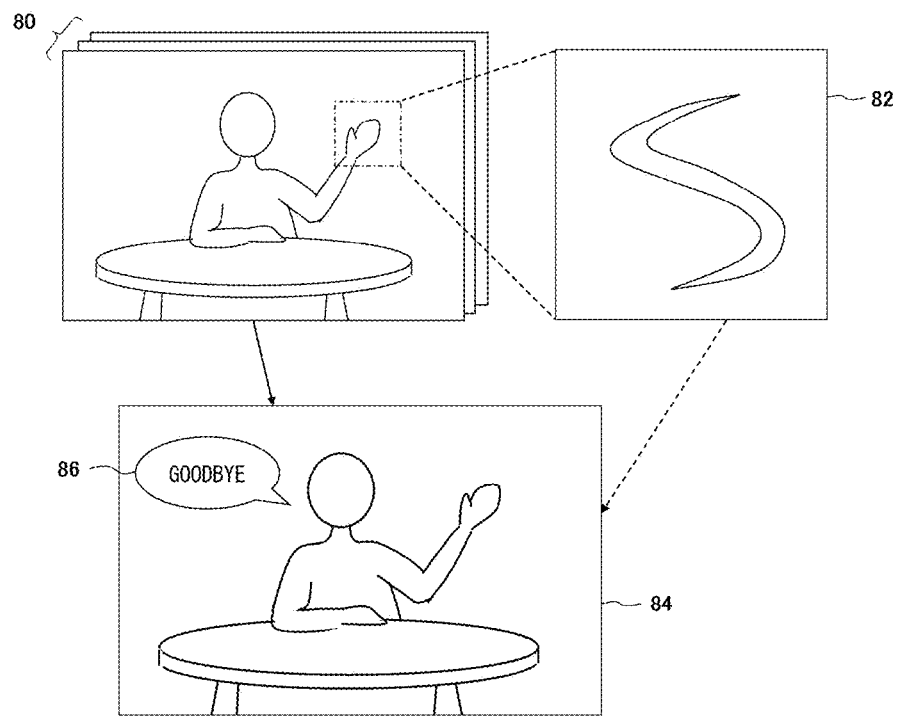
FIG. 11 shows examples of images captured by the imaging devices and an example of output image obtained by using the images according to a variation of the embodiment in which the imaging devices differ in the magnitude of angle of view and frame rate.

FIG. 11 shows examples of images captured when the first camera 28 is used to capture a wide-angle image and the second camera 30 is used to capture a narrow-angle, low frame rate image, and an example of output image obtained by using these images. Referring to the figure, the image captured by the first camera 28 is a wide-angle image 80 captured at a standard frame rate, as in the previous case. The image captured by the second camera 30 is a narrow-angle, low frame rate image 82 of a target region. Given that n1>n2, the second camera 30 captures a total of n2 frames of narrow-angle, low frame rate images 82 while the first camera 28 captures a total of n1 frames of wide-angle images 80.

In this case, it is assumed that the hand of an imaged person is detected as a target and a narrow-angle, low frame rate image of the region is captured. If the imaged person waves the hand, the side-to-side motion of the hand appears as shown in the narrow-angle, low frame rate image 82. In other words, because the scan proceeds from top to bottom of the scan line while the hand is waved side to side, the shape of the hand showing the side-to-side reciprocal motion of the hand extended vertically can be acquired.

The second image analysis unit 34 acquires this narrow-angle, low frame rate image 82 and acquires the variation in the speed of the hand by referring to the horizontal displacement of the hand and the vertical scan speed. The second image analysis unit 34 refers to a predefined table mapping patterns of motion to gestures, using the information thus acquired as a key, and determines whether a gesture is made. As in the previous case, an output image 84 is generated by processing the wide-angle image 80 according to the gesture. In the illustrated example, a speech bubble saying "Goodbye" is placed besides the imaged subject.

(3) Embodiment in which Exposure Time/Stop Value Differ(s).

In this embodiment, one or both of exposure time and stop value used at the time of imaging differ(s) between the two cameras. Recently, technologies have been proposed whereby a user holds a marker such as a light-emitting object or wears it on the user's body so that the user's motion is detected by imaging the marker and the detected motion is used as input information in a game. Such technologies are built on the premises that a marker having a specific size, color, shape, luminance, etc. can be distinguished without exception from a room, person, object, etc. captured in an image. However, unlike visual observation by human beings, the appearance of a marker in an image varies significantly depending on imaging environment such as the ambient brightness, whether an object is located, the color of things that surround the marker, and on imaging conditions such as exposure time and depth of focus.

When a wide-angle image including the user and the room is captured, imaging conditions such as white balance and exposure time are generally automatically adjusted depending on the imaging environment then available so that an image balanced as a whole is captured. In the case of detecting a marker in the image, however, variation in the imaging condition results in variation in the appearance of the marker in the image, i.e., the color, size, shape, luminance of the image, which may result in unsuccessful detection.

For example, given that a light-emitting marker is used, if the exposure time determined according to the brightness of the room is too long, the RGB values of the light-emitting portion of the marker saturate, resulting in a white and blurred image irrespective of the color of the light-emitting object. If the marker is moving fast, the image may be slurred.

For this reason, the position of the marker including the position in the depth direction may not be accurately acquired, or, where users are supposed to be distinguished according to the color of the light-emitting body, distinction is disabled. This embodiment addresses this by ensuring that one of the cameras capture a whole image using a standard exposure time and stop value, and the other camera captures an image, setting one or both of exposure time and stop value to be most suitable to capture the marker. This ensures that the marker can be accurately detected in any imaging environments while also securing a well-balanced image worth viewing as an ultimately output image.

Figure 12:
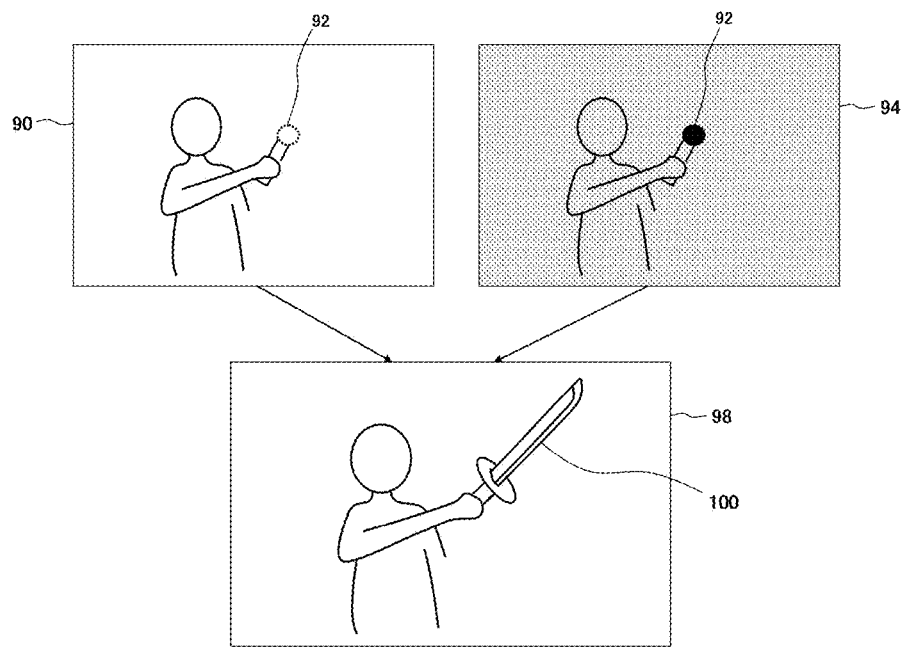
FIG. 12 shows examples of images captured by the imaging devices and an example of output image obtained by using the images according to a variation of the embodiment in which the imaging devices differ in exposure time/stop value.

FIG. 12 shows examples of images captured by the first and second cameras 28 and 30 and an example of output image obtained by using these images. Referring to the figure, the image captured by the first camera 28 is an ordinary image 90 capturing the user holding a marker 92 with a spherical end emitting light, with the exposure time and stop value optimal for the image as a whole. In this image, the light-emitting object of the marker 92 may be captured in white despite its actual color. The shape of the marker is not limited to the one shown in the figure. The marker may be any object that could be detected with a known color, shape, size, luminance, etc. Further, the marker may not be a light-emitting object.

Meanwhile, the image captured by the second camera 30 is an image 94 for which the imaging condition is adjusted. The image 94 is captured with the exposure time and stop value optimal for the light-emitting object of the marker 92. For example, the exposure time of this image may be shorter than that of the ordinary image 90, and the depth of focus (small stop value) may be smaller than the ordinary image 90. The focus is on the marker 92. The exposure time is adjusted by the shutter speed of the electronic shutter. By increasing the shutter speed, the exposure time is reduced.

By making such adjustments, the image 94 for which the imaging condition is adjusted may look dark as a whole or show objects other than the marker blurred. Instead, the color, shape, size, and luminance of the light-emitting object of the marker 92 will be true to the original. The image 94 for which the imaging condition is adjusted may be a narrow-angle image capturing only the portion of the marker. In this case, the embodiments (1) and (2) will be used in combination depending on the accuracy required for detection of the marker, processing capabilities of the information processing device, or the like, so as to track or detect the position of the marker 92.

The second image analysis unit 34 uses the image 94 for which the imaging condition is adjusted to acquire the position of the marker and recognize the motion of the user. Then an output image 98 is generated by processing the ordinary image 90 according to the motion. In the example of FIG. 12, the second image analysis unit 34 recognizes that the user swings the marker 92 down and displays a sword 100 held by the user as if it is extended accordingly in the virtual world in the output image.

Figure 13:
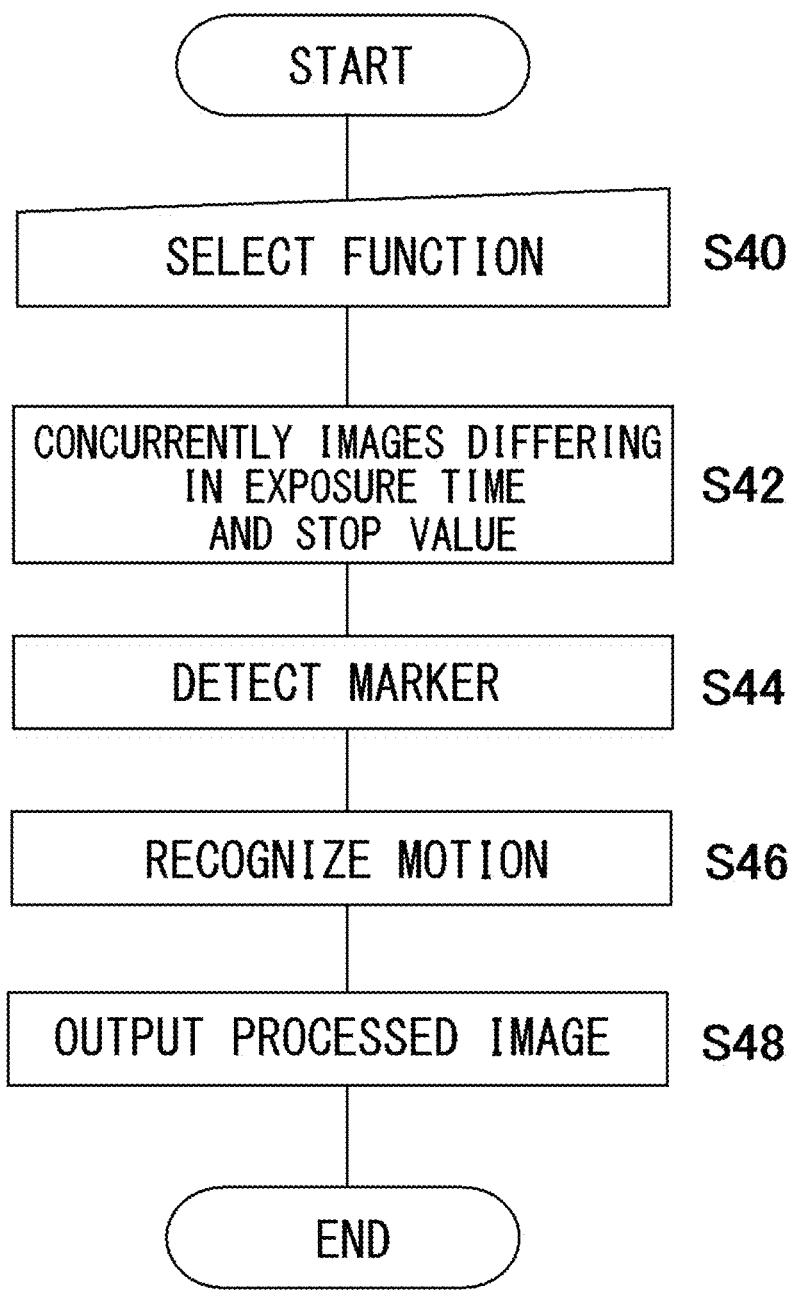
FIG. 13 is a flowchart showing the steps of information processing according to the embodiment in which the imaging devices differ in exposure time/stop value.

FIG. 13 is a flowchart showing the steps of information processing in this embodiment. The flowchart of FIG. 13 is started when the user provides an input to start imaging and outputting of image data in the input information acquisition unit 22. As in FIGS. 5 and 9, the user provides, in the information acquisition unit 22, a user input to select a function (S40). The imaging condition control unit 24 then causes the first camera 28 to start imaging using the exposure time and stop value optimal to the whole of the field of image, and causes the second camera 30 to start imaging using the exposure time and stop value optimal to the light-emitting object of the marker (S42).

The imaging condition of the first camera 38 may be set depending on the environment then available, using an ordinary calibration method. Optimal values of the imaging condition of the second camera 30 acquired for each property of the marker (e.g., color or luminance of the marker) may be described in the imaging condition table so that the condition is selected by referring to the actual property of the marker. Alternatively, calibration may be performed when starting to capture an image so as to determine the optimal condition. If the second camera 30 is configured to capture a narrow-angle image, the field of view of the narrow-angle image may be determined by detecting the rough position of the marker in the wide-angle image, as in S24 and S26 of FIG. 9.

The second image analysis unit 34 detects the marker in the image captured by the second camera 30 for which the imaging condition is adjusted (S44) and recognizes the motion of the user by referring to the motion of the marker (S46). The result of recognizing the motion and the data for the wide-angle image captured by the first camera 28 are successively supplied to the information integration unit 36. The information integration unit 36 transmits the image data to the image data generation unit 38 along with an animation or content of image processing prepared in association with the motion, and information indicating the position where the process is applied, and directs the unit 38 to process the image. In response, the image data generation unit 38 generates and outputs a processed image (S48).

As in the embodiment (2), the process performed in response to the recognition of a motion is non-limiting. The process may be combined with a known image processing technique in a variety of manner to suit the content of game or the purpose of information processing. As described with reference to FIG. 7, two narrow-angle images of two markers for which the imaging conditions are respectively adjusted may be captured by the two cameras. This allows the motion of the two markers to be recognized independently and allows, for example, a match-up game in a virtual space to be represented.

According to the embodiment described above, a given space is imaged in different conditions using two cameras. This allows acquisition of information unique to the imaging condition in a complementary manner, allowing a variety of functions can be implemented depending on the combination. By forming images with a high resolution or high frame rate as narrow-angle images, excessive growth of data size is prevented and it is ensured that data transfer in the information processing device and image data transfer via a network are facilitated. In further accordance with this embodiment, pairs of cameras that are commonly available as stereo cameras can be used unmodified so that the functionality can be improved without increasing the cost.

Embodiment 2

In the Embodiment 1, a pair of cameras having the same structure are used, and a desired function is implemented by using different imaging conditions so as to allow the two cameras to complement the information with each other. According to this embodiment, a pair of cameras having structures that are different at least partially are used. The structure of the information processing system, the imaging device 12, or the information processing device 14 to which this embodiment can be applied is the same as the structure described in Embodiment 1, except that the first camera 28 and the second camera 30 differ at least partially in their hardware structure. The structural difference may relate to ordinary features in the camera such as sensor size. Alternatively, the cameras may differ in the variable range of an adjustable value indicating an imaging condition such as focal length. In the latter case, the variable ranges may partially overlap. The structural difference in the cameras will be described below item by item. The cameras may differ in two or more items.

(1) Two Cameras with Different Resolutions (Sensor Sizes)

For example, the first camera 28 may be a camera with a standard or lower resolution, and the second camera 30 may be a camera with a higher resolution than the first camera 28. These cameras are used to implement "(1) embodiment in which the angle of view and resolution differ" of Embodiment 1 described above. Since the cameras are inherently different in the resolution, it is not necessary to adjust the angle of view concurrently. In this case, an image in which a low-resolution image and a high-resolution image are synthesized can be output by capturing an overview image using the first camera 28 and imaging only the target region using the second camera 30, as indicated in FIG. 4, for example. The steps are the same as those described with reference to FIG. 5.

As mentioned above, flexibility in configuring the angles of view is increased compared with Embodiment 1 so that the low-resolution first camera 28 need not necessary take a wide-angle view and the high-resolution second camera 30 need not necessarily take a narrow-angle view. Depending on the contrast of the resolutions which the respective cameras ordinary implement, more dynamic difference is resolution may be shown in the synthesized image. The embodiments described with reference to FIGS. 6 and 7 can equally be implemented. When two narrow-angle images with substantially the same size and same resolution such as the images 60 and 62 of FIG. 7 are required, a relevant region may have to be cropped out from the wide-angle image captured by the second camera 28 while also capturing the narrow-angle image 60 using the low-resolution first camera 28.

(2) Two Cameras with Different Frame Rates

For example, the first camera 28 may have a standard or lower frame rate and the second camera 30 may have a higher frame rate than the first camera 28. These cameras are used to implement "(2) Embodiment in which the magnitude of angle of view and frame rate differ" of Embodiment 1. Again, adjustment of the angle of view is not quite necessary in this case. The first camera captures an overview image and the second camera 30 images only a target region at a higher frame rate, as indicated in FIG. 8, for example. The subject is tracked accurately using the image captured by the second camera 30 and the overview image captured by the first camera 28 is processed according to the result of tracking. The steps are the same as those described with reference to FIG. 9.

Again, the subject can be tracked efficiently by detecting the target in the overview image captured by the first camera 28 and imaging only the target region at a higher frame rate using the second camera 30. In this case, only the target region may be cropped out from the image captured by the second camera 30 before performing a tracking process. To further improve the accuracy of tracking, the resolution of the camera having a higher frame rate may be lower than that of the camera having a lower frame rate to increase the sensitivity. By using two cameras with different frame rates, the subject can be tracked more accurately in concurrence with the acquisition of the output image.

In one variation, the image captured at a lower frame rate is subject to a facial recognition process so as to detect a face. The position of the hand or a marker held by the hand may be estimated with reference to the position of the detected face, and the high frame rate camera may target the estimated position for imaging. As far as subjects with little motion such as a face are concerned, clear images are more likely to be acquired and the accuracy of (facial) recognition can be increased by using a lower frame rate than the standard. Therefore, the position of the face, and, ultimately, the target can be detected accurately by capturing an overview image at a low frame rate.

(3) Cameras with Different Shutter Speeds

For example, the first camera 28 may have a standard shutter speed and the second camera 30 may have a higher shutter speed than the first camera 28. These cameras are used to implement (3) embodiment in which exposure time/stop value is made to differ(s)" of Embodiment 1. The first camera 28 captures an ordinary image and the second camera 30 images the same region using a higher shutter speed and a shorter exposure time, as indicated in FIG. 12, for example. The marker is tracked accurately using the image captured by the second camera 30 and the ordinary image captured by the first camera 28 is processed according to the result of tracking and is output. The steps of are the same as those described with reference to FIG. 13. By using two cameras with different shutter speeds, the marker can be detected more accurately concurrently with the acquisition of the output image.

(4) Two Cameras with Different Focal Lengths

For example, the first camera 28 may have a standard focal length and the second camera 30 may have a shorter focal length than the first camera 28. These cameras are used to implement "(3) embodiment in which exposure time/stop value differ(s)" of Embodiment 1. The first camera 28 captures an ordinary image and the second camera 30 images the same region using a shorter focal length, as indicated in FIG. 12, for example. The marker is tracked accurately using the image captured by the second camera 30 and the ordinary image captured by the first camera 28 is processed according to the result of tracking and is output. The steps are the same as those described with reference to FIG. 13. By using two cameras with different focal lengths, the marker can be detected more accurately in concurrence with the acquisition of the output image.

(5) Two Cameras Capturing a Color (RGB) Image and a Black-and-White Image, Respectively For example, the first camera 28 may capture an ordinary color image and the second camera 30 may capture a black-and-white image. A black-and-white image can be captured with a higher speed than a color image. For this reason, the contour of a subject can be imaged relatively easily even in an environment such as an indoor environment in which the subject is likely to look blurred in an ordinary color image. Therefore, a black-and-white image is favorable for the purpose of tracking. Therefore, the first camera 28 captures a color image and the second camera 30 images the same region to capture a black-and-white image, in a similar way as that indicated in FIG. 12, for example. The marker is tracked accurately using the black-and-white image and the color image captured by the first camera 28 is processed according to the result of tracking and is output. The steps are the same as those described with reference to FIG. 13. By using a black-and-white image to track subjects other than a marker, the embodiment shown in FIG. 8 can be implemented. The similar embodiment can be implemented and the same advantage can be achieved by using a camera capturing a color image and an infrared camera in place of the cameras capturing a color image and a black-and-white image, respectively.

In the embodiment described above, two cameras at least partially different in the structure are used to image the same space. This allows acquisition of information unique to the respective cameras in a mutually complementary manner and a variety of functions can be implemented by combinations. Further, by differentiating original configurations of the cameras, it is possible to produce a large difference between the images captured by the respective cameras and a combined use suitable to the property of the subject of tracking is easy to build.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, two cameras at least partially different in the structure as described in Embodiment 2 may be further used for a process similar as that performed by a related-art stereo camera. For example, in the case that two cameras with different frame rates are used, a frame in a high frame rate image concurrent with a frame in a low frame rate image may be extracted from the high frame rate image so that the position of a subject (e.g., the position of the portion, which is closest to the camera, of a human being in front of the camera) in the depth direction is derived by triangulation in the two images occurring at respective points of time. At the same time, by tracking the arm or a marker using the high frame rate image as in Embodiment 2, an output image processed according to the absolute and relative positions of two portions of a human being can be generated.

Similarly, by converting the resolution of the higher-resolution image captured by one of the cameras with a higher resolution to adapt to the resolution of the lower-resolution image, a process similar to that of a stereo camera can be performed. Thus, by concurrently implementing the function of a stereo camera and the above-described function implemented by two cameras having different structures, information that can be output is consequently increased in a synergistic manner.

Alternatively, only one of the two cameras may be provided with a zoom mechanism, a mechanism such as electronic pan and tilt capability capable of adjusting the angle of view, or both. This allows detecting a target by using an overview image captured by a camera with a fixed angle of view and selectively imaging the target region by a camera with an adjustable angle of view. For example, this can consequently implement an embodiment in which a zoomed-in view of a human being and an overview image are synthesized, as shown in FIG. 3. This difference in mechanism may be combined with a difference in other aspects of the configuration described in Embodiment 2.

What is claimed is:

1. An information processing system adapted to generate output image data by capturing an image of a subject and successively acquiring data of the image, comprising:
    first and second cameras configured to capture first and second images of the subject, respectively;
    an image analysis unit configured to process the first image such that at least one region of interest of the subject found within the first image is identified;
    a control unit configured to cause the first and second cameras to capture the first and second images of the subject using respective imaging parameters, and to cause the second camera to capture the second image of the subject such that the second image is limited to the at least one region of interest; and
    an information integration unit configured to integrate the first and second images so as to generate the output image data by substituting image data of the first image corresponding to the at least one region of interest of the subject with image data of the second image, wherein:
    the second image captured by the second camera is subject to an imaging condition defined to track a target within the subject,
    the image analysis unit is configured to recognize motion by the target by: (i) tracking the target in the second image captured by the second camera, (ii) determining a pattern of the motion of the target in the second image, (iii) comparing the pattern of motion of the target with a plurality of predetermined patterns of motion, and (iv) selecting one or more of the predetermined patterns of motion based on the comparison, and
    the information integration unit generates the output image data by processing the first image captured by the first camera and including the target in accordance with the selected one or more predetermined patterns.

2. The information processing system according to claim 1, wherein the second camera captures the second image using an imaging condition defined to acquire positional information on a predetermined target on the subject, and
    wherein the information integration unit generates the output image data by inducing, in the first image captured by the first camera, an image change dependent on the positional information of the predetermined target.

3. The information processing system according to claim 1, wherein the second image captured by the second camera is subject to an imaging condition defined in accordance with a shape of a marker provided in a target on the subject,
    wherein the image analysis unit is configured to recognize motion by the target by detecting the marker within the second image captured by the second camera, and
    wherein the information integration unit generates the output image data by processing the first image captured by the first camera and including the target in accordance with a pattern of the motion of the target.

4. The information processing system according to claim 1, wherein the second image captured by the second camera is subject to an exposure time shorter than an exposure time of the first camera used at the time of imaging.

5. The information processing system according to claim 1, wherein the second image captured by the second camera is subject to a stop value smaller than a stop value of the first camera used at the time of imaging.

6. The information processing system according to claim 1, wherein the second image captured by the second camera is subject to a frame rate higher than a frame rate of the first camera used at the time of imaging.

7. The information processing system according to claim 1, wherein the second image captured by the second camera is subject to a frame rate lower than a frame rate of the first camera used at the time of imaging, and
    wherein the image analysis unit is configured to refer to a displacement of a predetermined target in an image frame captured by the second camera and to a scan speed used at the time of capturing the image so as to acquire a change in target speed of the target and to thereby recognize motion by the target.

8. The information processing system according to claim 1, wherein the image analysis unit is configured to detect a position of a predetermined target within the subject by analyzing image data obtained through imaging by the first camera,
    wherein the second camera refers to positional information on the target and captures the second image of a region including the target at a narrow angle of view and a higher resolution than the first image captured by the first camera, and
    wherein the information integration unit generates the output image data by synthesizing the second image captured by the second camera in the region including the target in the first image captured by the first camera.

9. An information processing device adapted to generate output image data by successively acquiring image data of a subject, comprising:
    an image analysis unit configured to: (i) receive first and second images of the subject from first and second cameras, respectively, where first image is captured using a first frame rate, and the second image is captured using a second frame rate, higher than the first frame rate; and (ii) recognize motion of a target within the subject by: (a) tracking the target in the second image captured by the second camera, (b) determining a pattern of the motion of the target in the second image, (c) comparing the pattern of motion of the target with a plurality of predetermined patterns of motion, and (d) selecting one or more of the predetermined patterns of motion based on the comparison;

an imaging condition control unit configured to cause the first and second cameras to capture the first and second images of the subject using respective imaging parameters; and an information integration unit configured to integrate the first and second images so as to generate output image data by adding animation image data to the first image, where the animation image data are specific to the recognized motion of the target within the subject.

10. An information processing method adapted to successively acquire image data of an image capturing a subject and to output associated output image data, comprising:

receiving first and second images of the subject from first and second cameras, respectively;

processing the first image such that at least one region of interest of the subject found within the first image is identified;

controlling the first and second cameras to capture the first and second images of the subject using respective imaging parameters, and causing the second camera to capture the second image of the subject such that the second image is limited to the at least one region of interest;

integrating the first and second images so as to generate the output image data by substituting image data of the first image corresponding to the at least one region of interest of the subject with image data of the second image; and outputting the output image data to a display device, wherein:

the second image captured by the second camera is subject to an imaging condition defined to track a target within the subject, the method further comprises recognizing motion by the target by: (i) tracking the target in the second image captured by the second camera, (ii) determining a pattern of the motion of the target in the second image, (iii) comparing the pattern of motion of the target with a plurality of predetermined patterns of motion, and (iv) selecting one or more of the predetermined patterns of motion based on the comparison, and the step of integrating includes generating the output image data by processing the first image captured by the first camera and including the target in accordance with the selected one or more predetermined patterns.

11. A non-transitory computer-readable recording medium containing a computer program, the computer program being adapted to cause a microprocessing system to successively acquire image data of an image capturing a subject and to output associated output image data, the computer program comprising:

an image analysis module configured to: (i) receive first and second images of the subject from first and second cameras, respectively; and (ii) process the first image such that at least one region of interest of the subject found within the first image is identified;

a control module configured to cause the first and second cameras to capture the first and second images of the subject using respective imaging parameters, and to cause the second camera to capture the second image of the subject such that the second image is limited to the at least one region of interest;

an integration module configured to integrate the first and second images so as to generate output image data by substituting image data of the first image corresponding to the at least one region of interest of the subject with image data of the second image; and an output module configured to output the output image data to a display device, wherein:

the second image captured by the second camera is subject to an imaging condition defined to track a target within the subject, the image analysis module is further configured to recognize motion by the target by: (i) tracking the target in the second image captured by the second camera, (ii) determining a pattern of the motion of the target in the second image, (iii) comparing the pattern of motion of the target with a plurality of predetermined patterns of motion, and (iv) selecting one or more of the predetermined patterns of motion based on the comparison, and the integration module is further configured to generate the output image data by processing the first image captured by the first camera and including the target in accordance with the selected one or more predetermined patterns.

12. An information processing device adapted to successively acquire image data of a subject and to generate output image data, the information processing device comprising:

an image analysis unit configured to: (i) receive first and second images of the subject from first and second cameras, respectively, where first image is captured using a first frame rate, and the second image is captured using a second frame rate, lower than the first frame rate; and (ii) recognize motion of a target within the subject by referencing a displacement of the target in at least two image frames of the second image using a scan speed;

a control module configured to cause the first and second cameras to capture the first and second images of the subject using respective imaging parameters;

an integration module configured to integrate the first and second images so as to generate output image data through by modifying image data of the first image to include further image data in accordance with the detected motion of the target within the subject; and an output module configured to output the output image data to a display device, wherein:

the second image captured by the second camera is subject to an imaging condition defined to track a target within the subject, the image analysis module is further configured to recognize motion by the target by: (i) tracking the target in the second image captured by the second camera, (ii) determining a pattern of the motion of the target in the second image, (iii) comparing the pattern of motion of the target with a plurality of predetermined patterns of motion, and (iv) selecting one or more of the predetermined patterns of motion based on the comparison, and the integration module is further configured to generate the output image data by processing the first image captured by the first camera and including the target in accordance with the selected one or more predetermined patterns.

13. An information processing system adapted to generate output image data by capturing an image of a subject and by successively acquiring data of the image, comprising:

a pair of cameras, comprising a first camera and a second camera, which has a higher resolution than the first camera;

an image analysis unit configured to process the first image such that at least one region of interest of the subject found within the first image is identified;

a control unit configured to cause the first and second cameras to capture the first and second images of the subject using respective imaging parameters, and to cause the second camera to capture the second image of the subject such that the second image is limited to the at least one region of interest; and an information integration unit configured to generate the output image data, wherein:

the second image captured by the second camera is subject to: (i) an imaging condition defined to track a target within the subject, and (ii) a frame rate lower than a frame rate of the first camera used at the time of imaging, the image analysis unit is further configured to: (i) recognize motion by the target by reference to a displacement of the target and to a scan speed used at the time of capturing the image so as to acquire a change in target speed of the target, and (ii) recognize a gesture of the target based on a pattern of the motion of the target, and the information integration unit generates the output image data by processing the first image captured by the first camera and including text corresponding to the gesture in the output image data.

14. A method to generate output image data by capturing an image of a subject and successively acquiring data of the image, comprising:

providing a pair of cameras, comprising a first camera and a second camera, which has a higher frame rate than the first camera;

processing the first image such that at least one region of interest of the subject found within the first image is identified;

causing the first and second cameras to capture the first and second images of the subject using respective imaging parameters, and causing the second camera to capture the second image of the subject such that the second image is limited to the at least one region of interest; and generating the output image data, wherein:

the second image captured by the second camera is subject to: (i) an imaging condition defined to track a target within the subject, and (ii) a frame rate lower than a frame rate of the first camera used at the time of imaging, the processing includes: (i) recognizing motion by the target by reference to a displacement of the target and to a scan speed used at the time of capturing the image so as to acquire a change in target speed of the target, and (ii) recognizing a gesture of the target based on a pattern of the motion of the target, and the generating includes generating the output image data by processing the first image captured by the first camera and including text corresponding to the gesture in the output image data.

15. A non-transitory, computer readable storage medium containing a computer program, which when executed by a computer, generates output image data by capturing an image of a subject and by successively acquiring data of the image, comprising:

controlling a pair of cameras, comprising a first camera and a second camera, which has a higher shutter speed than the first camera;

processing the first image such that at least one region of interest of the subject found within the first image is identified;

causing the first and second cameras to capture the first and second images of the subject using respective imaging parameters, and causing the second camera to capture the second image of the subject such that the second image is limited to the at least one region of interest; and generating the output image data, wherein:

the second image captured by the second camera is subject to: (i) an imaging condition defined to track a target within the subject, and (ii) a frame rate lower than a frame rate of the first camera used at the time of imaging, the processing further includes: (i) recognizing motion by the target by reference to a displacement of the target and to a scan speed used at the time of capturing the image so as to acquire a change in target speed of the target, and (ii) recognizing a gesture of the target based on a pattern of the motion of the target, and the generating includes generating the output image data by processing the first image captured by the first camera and including text corresponding to the gesture in the output image data.

* * * * *